United States Patent [19]

Dworkin et al.

[11] Patent Number: 5,069,986

[45] Date of Patent: Dec. 3, 1991

[54] SELECTIVE DISCHARGE LIMITING SEAL FOR A BATTERY

[75] Inventors: David R. Dworkin, Lawrenceville, Ga.; Robert D. Lloyd; Tuan Nguyen, both of Boca Baton, Fla.

[73] Assignee: Motorola, Inc., Schaumburg, Ill.

[21] Appl. No.: 649,187

[22] Filed: Feb. 4, 1991

Related U.S. Application Data

[63] Continuation of Ser. No. 426,914, Oct. 26, 1989, abandoned.

[51] Int. Cl.$^5$ .............................................. H01M 8/04
[52] U.S. Cl. ...................................... 429/27; 429/52; 429/72; 429/110; 429/48
[58] Field of Search ....................... 429/27, 48, 52, 72, 429/110, 122; 428/41, 914

[56] References Cited

U.S. PATENT DOCUMENTS

| | | | |
|---|---|---|---|
| 2,074,506 | 3/1937 | Heise | 429/27 |
| 2,468,430 | 4/1949 | Denksen | 429/27 |
| 2,632,032 | 3/1953 | Winckler | 429/27 |
| 3,837,921 | 9/1974 | Henssen | 429/27 |
| 4,118,544 | 10/1978 | Przbyla et al. | 429/27 |
| 4,189,526 | 2/1980 | Cretzmeyer et al. | 429/27 |
| 4,262,062 | 4/1981 | Zatsky | 429/27 |
| 4,493,880 | 1/1985 | Lund | 429/97 |

Primary Examiner—Anthony Skapars
Attorney, Agent, or Firm—Vincent B. Ingrassia; Thomas G. Berry

[57] ABSTRACT

A method of reducing the discharge rate of a battery while providing a desired current comprising the steps of incrementally controlling the amount of one or more activating gases provided to an energy storage means, and providing an energy level responsive to the selectable amount of said one or more activating gases.

6 Claims, 1 Drawing Sheet

SELECTIVE DISCHARGE LIMITING SEAL FOR A BATTERY

This is a continuation of Application Ser. No. 07/046,914, filed Oct. 26,1989 now abandoned.

FIELD OF THE INVENTION

This invention relates in general to the field of energy sources, and more specifically, to a battery having a selective discharge limiting seal for regulating the discharge rate and maximum current drain of the battery.

BACKGROUND OF THE INVENTION

Selective call receivers (including pagers) have historically relied on batteries as their main power source. As selective call receivers become smaller, the battery occupies an increasing amount of space relative to the remainder of the selective call receiver's housing. Therefore, it is desirable to reduce the size of the battery while maintaining at least the same energy capacity as contemporary batteries. Air-breathing (e.g., zinc-air) batteries meet these requirements, and therefore, are becoming more widely used in selective call receivers. As is known, proper zinc-air battery operation relies on air availability since the internal chemical reaction that occurs in a zinc-air battery results from the oxygen-zinc reaction.

Contemporary zinc-air battery construction incorporates the zinc into a casing having a number of holes to allow air to reach the zinc. These holes are initially sealed to prevent the zinc from prematurely reacting with the air (which reduces the battery's shelf life). Before using the battery to power a product, the seal(s) covering the air-holes are removed so as to allow the infiltration of air.

Generally, battery manufacturers attempt to produce batteries that will meet the broadest market demand. Therefore, it is common to manufacture batteries with a larger amount (or size) of holes than necessary to meet the needs of many applications. Regrettably, this practice tends to result in premature fuel exhaustion (commonly referred to as "self discharge"). That is, since the zinc-air reaction is dependent upon the amount of oxygen allowed to reach the zinc, the resulting continuous chemical reaction is often in excess of the requirements of the device due to the excessive number of holes, and therefore, the amount of air supplied. Thus, a need exists for an air-breathing battery in which the chemical reaction may be selectively controlled depending on the power requirements of the device being operated.

SUMMARY OF THE INVENTION

In carrying out the above, there is provided in one form of the invention a method of reducing the discharge rate of a battery while providing a desired current comprising the steps of incrementally controlling the amount of one or more activating gases provided to an energy storage means, and providing an energy level responsive to the selectable amount of said one or more activating gases.

DETAILED DESCRIPTION OF THE INVENTION

Figure 1:
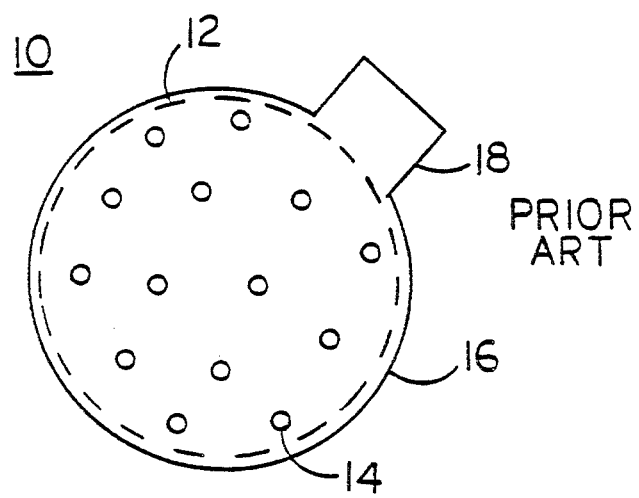
FIG. 1 is a top view of a conventionally sealed zinc-air battery.

Referring to FIG. 1, a typical air-breathing battery 10 comprises a sealed (16) outer casing 12 having a plurality of supply holes 14 for facilitating the infiltration of one or more gases (e.g., air). Before using the battery 10 to power a product or device, the seal 16 is removed such as by pulling on an integral tab 18. This allows any surrounding atmospheric gases to contact an internal chemical substance via the now exposed supply holes 14. That is, the supply holes 14 allow oxygen and other gases to reach a chemical (e.g., zinc) thereby causing a chemical reaction, which generates electrical power. A number of chemicals and gases may be used without varying from the intent of the invention. As will be appreciated, if an over-supply of air reaches the chemical, a larger that necessary chemical reaction occurs, which reduces the operational lifetime of the battery. Thus, exposing all of the supply holes 14 to the atmosphere results in the battery 10 self-discharging at a more rapid rate than if the air supply holes 14 were only partially exposed. This results in the battery 10 discharging more rapidly than necessary even when not powering a device or product.

Figure 2:
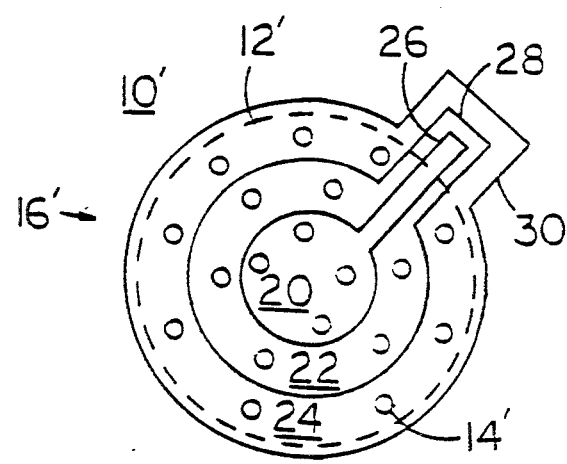
FIG. 2 is a top view of a zinc-air battery in accordance with the present invention.

Referring to FIG. 2, the holes 14' on the zinc-air battery 10' may be selectively exposed on an incremental basis to limit self-discharge and maximum current drain. The number and size of the holes 14' in zinc-air batteries determines the maximum current capability of the battery and the rate at which the battery will self-discharge. Therefore, dividing the seal into a number of sections allows the number of air supply holes 14' that are exposed to more clearly match the requirements of the device in which it is used (e.g., selective call receiver). In the preferred embodiment, the method of sealing the air supply holes 14' is accomplished by dividing the tape 16' into an inner section 20, a middle section 22 and an outer section 24 with tabs 26, 28, and 30 attached, respectively. The sections 20, 22 and 24 may then be removed entirely or in combination to expose the air supply holes 14' as required, thereby controlling the battery's 10' current capability and appropriately limiting the self-discharge rate.

Figure 3:
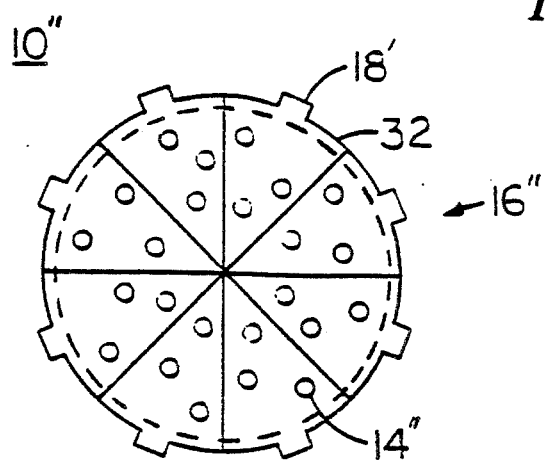
FIG. 3 is a top view of an alternate embodiment of a zinc-air battery in accordance with the present invention.

Referring to FIG. 3, an alternate embodiment of the present invention is shown. The zinc-air battery 10" also includes air supply holes 14". Maximum current capability and maximum current drain are controlled by sealing the air supply holes 14" with the tape 16". The tape 16" is divided into a plurality of wedge-shaped sections 32 each having an integrated tab 18'. The sections 32 may be selectively removed on an incremental basis to control the desired amount of chemical reaction and corresponding current. The size, shape, and number of the sections 32 used to seal the air supply holes 14" may vary substantially without deviating from the intent of the invention. The primary objective is to be able to expose the least amount of air supply holes 14" as possible, while maintaining a sufficient amount of power so as to operate a designated device.

We claim:
1. A battery comprising:
   energy storage means for storing energy and for providing energy in response to exposure to at least one activating gas; and tape sealing means comprising at least two tape portions being removably adhesively affixed to a surface of the battery for incrementally controlling the amount of one or more activating gases provided to the energy storage means by removing one or more of the at least two tape portions of the tape sealing means.

2. A battery, comprising:

energy storage means for storing energy and for providing energy in response to exposure to at least one activating gas; and tape sealing means comprising at least two portions being removably adhesively affixed contiguous to an outer casing of the battery for selectively limiting the at least one activating gas from reaching said energy means.

3. A battery, comprising:

energy storage means for storing energy and for providing energy in response to exposure to an atmosphere; and tape sealing means for comprising a plurality of tape portions being removably adhesively fixed to the battery so as to selectively and incrementally control exposure of said energy storage means to the atmosphere.

4. The battery according to claim 3 wherein said battery comprises a zinc-air battery.

5. The battery according to claim 3 wherein said energy means comprises a chemical reaction.

6. The battery according to claim 5 wherein said chemical reaction includes zinc and air.

* * * * *